United States Patent [19]
Law et al.

[11] Patent Number: 5,794,041
[45] Date of Patent: Aug. 11, 1998

[54] C++ OJBECT MODEL ALTERNATIVES

[75] Inventors: Theodore Cheuk-Tak Law, Markham, Canada; Michael George Burke, Yonkers, N.Y.; Harini Srinivasan, Tarrytown, N.Y.; Peter F. Sweeney, Chestnut Ridge, N.Y.

[73] Assignee: International Business Machines Corporation, Armonk, N.Y.

[21] Appl. No.: 761,545

[22] Filed: Dec. 6, 1996

[51] Int. Cl.$^6$ ............................................. G06F 9/45
[52] U.S. Cl. .................... 395/701; 395/705; 395/707; 395/708; 707/103
[58] Field of Search .......................... 395/701, 705, 395/680, 683, 685, 708, 707, 500; 707/103; 364/281.3, 280, 280.4, 284.3

[56] References Cited

U.S. PATENT DOCUMENTS

| | | | |
|---|---|---|---|
| 5,297,284 | 3/1994 | Jones et al. | 395/705 |
| 5,327,562 | 7/1994 | Adcock | 395/708 |
| 5,371,891 | 12/1994 | Gray et al. | 395/705 |
| 5,410,705 | 4/1995 | Jones et al. | 395/406 R |
| 5,432,936 | 7/1995 | Gray et al. | 395/705 |
| 5,442,793 | 8/1995 | Christian et al. | 395/683 |
| 5,465,362 | 11/1995 | Orton et al. | 395/677 |
| 5,617,569 | 4/1997 | Gray et al. | 707/103 |

FOREIGN PATENT DOCUMENTS 2097541  6/1993  Canada.

*Primary Examiner*—Emanuel Todd Voeltz
*Assistant Examiner*—Demetra R. Smith
*Attorney, Agent, or Firm*—Whitham, Curtis & Whitham; Jay P. Sbrollini

[57] ABSTRACT

Alternatives for laying out objects and/or virtual function tables (VFTs), sharing a virtual function table pointer with a direct, virtual base, eliminating the need for an early cast by increasing the number of virtual function table entries, and providing a smart virtual dispatch that eliminates late casts where possible. An object model can be constructed by choosing one option from each of several alternatives. Interaction of alternatives include (1) sharing VFT pointers with a direct, virtual base requires that virtual base pointers are not stored in objects and (2) sharing VFT pointers affects the sharing of virtual base pointers with base classes and placement of late cast adjustment arguments and determining virtual function table entries.

29 Claims, 9 Drawing Sheets

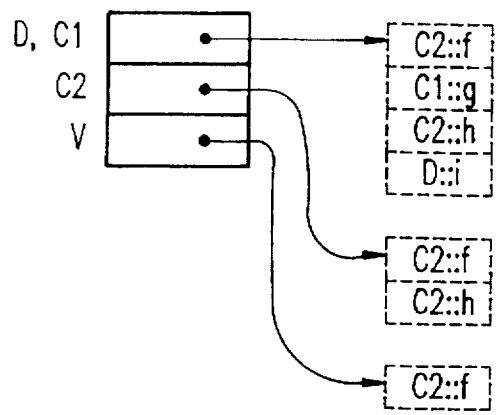
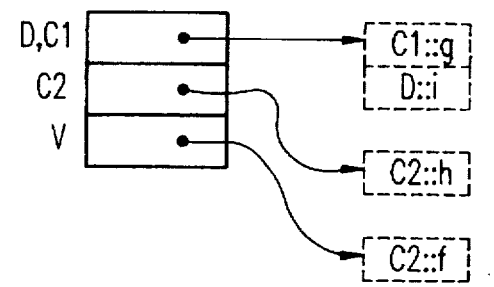
FIG.8A  FIG.8B
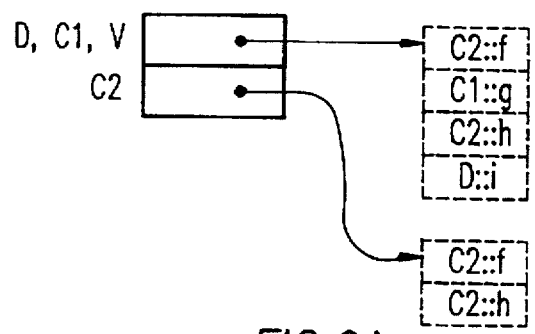
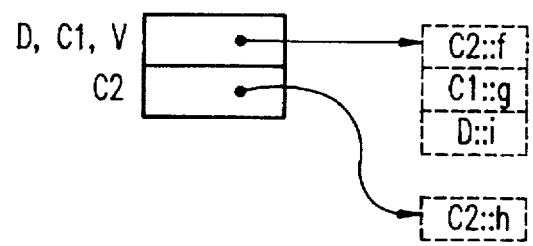
FIG.9A  FIG.9B
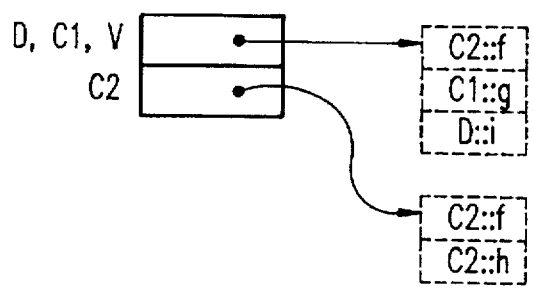
FIG.10

C++ OJBECT MODEL ALTERNATIVES

BACKGROUND OF THE INVENTION

1. Field of the Invention

The present invention generally relates to object oriented programming (OOP) systems and, more particularly, to C++ object model alternatives.

2. Background Description

Object oriented programming (OOP) is the preferred environment for building user-friendly, intelligent computer software. Key elements of OOP are data encapsulation, inheritance of attributes and polymorphism (i.e., overloading of operator names). These elements are used to generate a graphical user interface (GUI), typically characterized by a windowing environment having icons, mouse cursors and menus. While these three key elements are common to OOP languages, most OOP languages implement the three key elements differently.

In a conventional programming language, such as C or Pascal, procedures and functions are written to manipulate data and obtain solutions. The structure of these languages imposes rigid database management rules on the computer programmer requiring that appropriate data types are applied when procedures are used. In contrast, object oriented programming allows the programmer to view concepts as a variety of units or objects in a hierarchy, without worrying about the data type, repeated variable names, or function names. This allows the programmer to concentrate on the program design, rather than programming rules. The programmer can represent relationships among components, objects, tasks to be performed, and conditions to be met in a way that allows the reuse of code components and reduces the bulkiness of code and the time and effort needed to develop programs.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs.

There are several key concepts which characterize object oriented programming. These include virtual functions, inheritance and polymorphism. Implicit in virtual function invocation is the idea that the execution of a virtual function can vary with different objects; i.e., the behavior and response that the invocation elicits will depend on the object through which the function is invoked. Inheritance allows different data types to share the same code, leading to a reduction in code size and an increase in functionality. Polymorphism allows this shared code to be tailored to fit the specific circumstances of each individual data type. For more information on OOP languages in general and C++ in particular, the reader is referred to Grady Booch, *Object Oriented Design with Applications*, The Benjamin/Cummings Publishing Co. (1991), Bjarne Stroustrup, *The C++ Programming Language*, 2nd Ed., Addison-Wesley Publishing Co. (1991), and Margaret A. Ellis and Bjarne Stroustrup, *The Annotated C++ Reference Manual*, Addison-Wesley (1990).

Object oriented language features, such as polymorphism and inheritance, provide abstractions at the language level for building extensible, flexible, and reusable software. Nevertheless, these features come with a performance penalty. For example, conventional techniques for implementing virtual inheritance are inefficient in terms of both space and execution time. This discourages programmers from using virtual inheritance, although it is needed for good object oriented design techniques such as base class composition (Lee R. Nackman and John J. Barton, *Base-Class Composition with Multiple Derivatives and Virtual Bases, Sixth Usenix C++ Technical Conference* (1994).

The implementation of object oriented abstractions depends on the underlying object model. An object model consists of the specific structures and mechanisms used to support the object oriented features of the language. In C++, these features include single and multiple inheritance, virtual inheritance, and virtual functions. An object model determines the space and time overhead of object oriented language features. For some applications and hardware platforms, space is the most constrained resource; whereas for others, time is the most constrained resource. Although the performance penalty for object oriented language features cannot be fully eliminated, the space and/or time overhead penalty can be ameliorated by choosing an appropriate object model for an application and/or hardware platform's resource constraints.

SUMMARY OF THE INVENTION

It is therefore an object of the present invention to provide alternatives for laying out objects and/or virtual function tables.

It is another object of the invention to provide a way to share a virtual function table pointer and/or virtual base pointers with a direct, virtual base.

It is a further object of the invention to provide options that eliminate the need for an early virtual cast by increasing the number of virtual function table entries.

It is yet another object of the invention to provide a smart virtual dispatch that eliminates late casts where possible.

According to the invention, an object model can be constructed by choosing one option from each of several alternatives.

According to one aspect of the invention, virtual base pointers to virtual subobjects of an object are stored in that object's virtual function table. A virtual function table pointer of a direct, virtual base subobject is shared with a derived class object when the virtual base subobject has a fixed part containing only a virtual function table pointer. In the alternative, a virtual function table pointer of a direct, virtual base subobject is shared with a derived class object only when the fixed part of the virtual base subobject contains both a virtual function table pointer and either member data or non-virtual subobjects, and the derived class object has a fixed part that only contains a virtual function table pointer.

In a first alternative, a virtual function table for a class contains entries for all virtual functions introduced in that class, and for all virtual functions introduced in the virtual region of that class, thereby eliminating the need for an early virtual cast. In a second alternative, a virtual function table for a class contains entries for all virtual functions introduced in that class, and, if there is a direct virtual base of that class which is not a direct virtual base of any base class of that class, then that class's virtual function table also contains an entry for all virtual functions introduced in the virtual region of the base class, thereby eliminating the need for an early virtual cast.

According to another aspect of the invention, a smart dispatch performs an early cast to the most derived subobject, if it exists, that is a base-or-self of the static type and that defines the virtual function. The early cast requires that the derived subobject is in the nonvirtual region of the static type.

BRIEF DESCRIPTION OF THE DRAWINGS

The foregoing and other objects, aspects and advantages will be better understood from the following detailed description of a preferred embodiment of the invention with reference to the drawings, in which:

FIGS. 8A and 8B are diagrams illustrating VFT and object layouts for two virtual function entry options when VBPTRs are stored in objects;

FIGS. 9A and 9B are diagrams respectively illustrating VFT and object layouts for two virtual function entry options when VBPTRs are stored in VFTs and VFT pointers can be shared with virtual base subobjects;

FIG. 10 is a diagram illustrating VFT and object layouts for options when VBPTRs are stored in VFTs and VFT pointers may be shared with virtual base subobjects;

DETAILED DESCRIPTION OF PREFERRED EMBODIMENTS OF THE INVENTION

Figure 1:
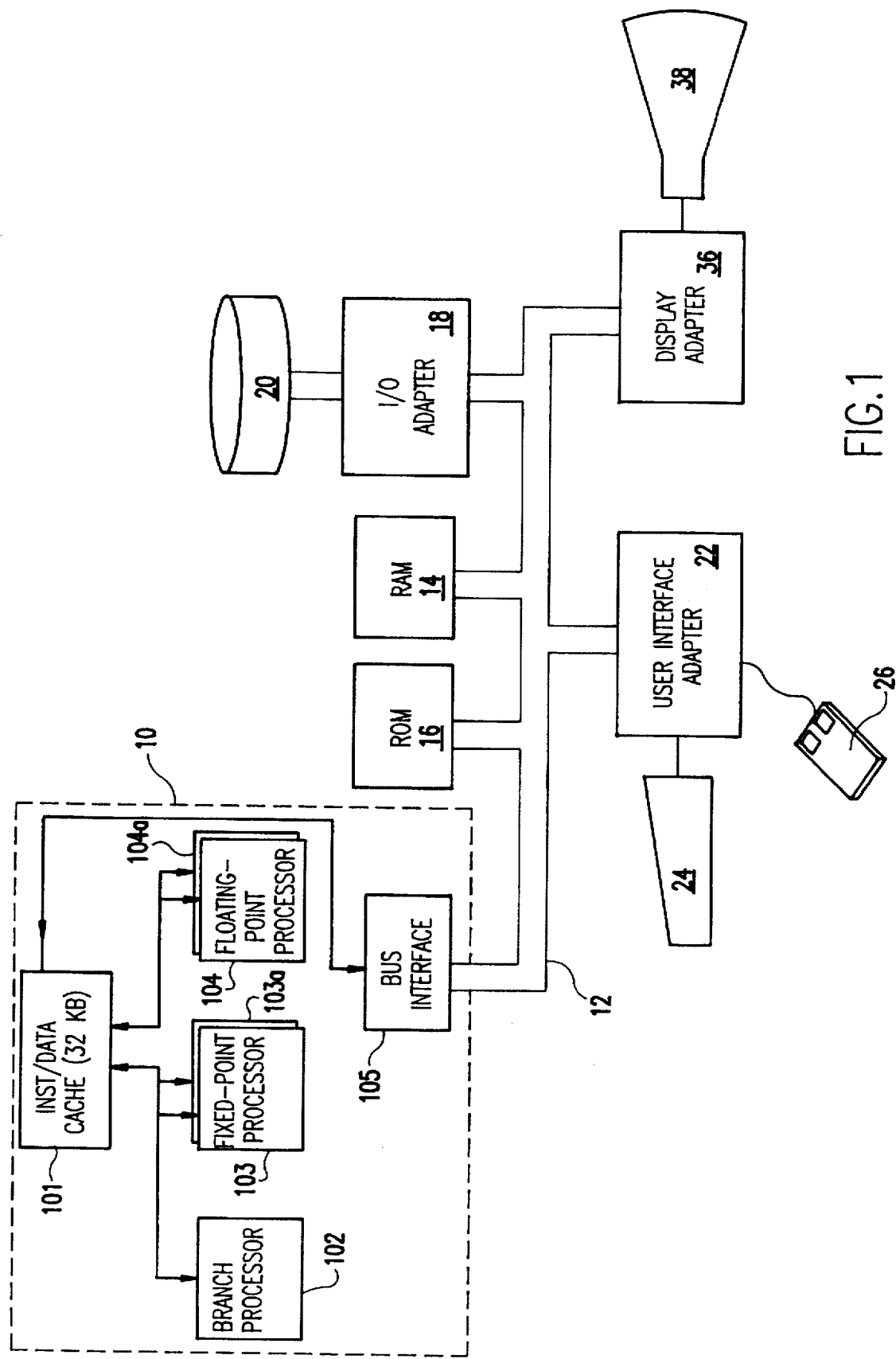
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a workstation such as IBM's RS/6000 Workstations as described, for example, by Jim Hoskins, *IBM RISC System/6000*, 5th Ed. John Wiley & Sons, Inc. (1995). The hardware includes a central processing unit (CPU) 10, which may be a RISC microprocessor such as IBM's PowerPC™ microprocessor as described in *The PowePC™ Architecture: A Specification for a New Family of RISC Processors*, edited by Cathy May, Ed Silha, Rick Simpson and Hank Warren, Morgan Kaufmann Publishers (1994). In one example, the PowerPC™ 601 architecture is used in the RISC System/6000 Model 250 workstation. The instruction and data caches are combined as a single cache 101. The branch processor 102 executes only branch instructions from cache 101. The CPU 10 additionally has a branch processor 102, a fixed-point processor or integer unit (FXU) 103 and a floating-point processor or unit (FPU) 104 which execute instructions on data supplied by cache 101. The cache 101 communicates with the bus interface 105.

The CPU 10 is attached to a system bus 12 to which are attached a random access memory (RAM) 14, a read only memory (ROM) 16, an input/output (I/O) adapter 18, and a user interface adapter 22. The RAM 14 functions as main memory to the CPU 10 and provides temporary storage for application program code and data, while ROM 16 typically includes the basic input/output system (BIOS) code and may be implemented with flash, or electronically programmable, memory. The I/O adapter 18, such as a SCSI (for small computer system interface) adapter, is connected to one or more Direct Access Storage Devices (DASDs), here represented as a disk drive 20. The disk drive 20 typically stores the computer's operating system (OS), such as IBM's AIX™ operating system, and various application programs, each of which are selectively loaded into RAM 14 via the system bus 12. The user interface adapter 22 has attached to it a keyboard 24, a mouse 26, and/or other user interface devices such as a touch screen device (not shown). Such touch screen device would optionally be installed on the display 38, here represented as a cathode ray tube (CRT) display but which may be a liquid crystal display (LCD) or other suitable display device. The display 38 is connected to the system bus 12 via a display adapter 34.

In order to better understand the invention, there is first presented some background material about object layout and the layout of supporting data structures used to implement object oriented language features. Polymorphism is a powerful language abstraction supported by C++ that provides a mechanism for flexibility that allows a variety of functions with the same signature to be called from the same call site. C++ also provides a mechanism for extensibility that allows new classes to be added that override existing functions. In C++, virtual functions provide the mechanism for polymorphism. The interpretation of the call of a virtual function depends on the type of the object for which it is called. Such a function is bound dynamically at run-time. This run-time mechanism is called virtual dispatch. Virtual dispatch is efficiently implemented as an indirect function call through a table of function addresses, called a virtual function table or VFT. Conceptually, the compiler generates one or more VFTs for any class that defines or inherits a virtual function. If a class has at least one VFT, then any object of that class has a pointer to one of the class's VFTs, and this pointer provides the mechanism for accessing the VFT. This pointer is referred to as the VFT pointer.

Consider the static (or declared) type, S, and the dynamic (or run-time) type, D, of the object pointed to p in the virtual function call, p→f( ). D may be S or a derived class of S, and a fully derived object of class D implies that the object's dynamic type is D. The actual function invoked at this call site is the function f that is inherited or overridden by D. Suppose this function is E::f( ); that is, f is defined in class E. The following steps may be necessary during virtual dispatch to E::f( ) at run-time, where the THIS pointer initially contains the address of the S subobject in the D object:

1. Adjust the THIS pointer to the subobject, X, in the D object whose VFT contains the entry that has the address of E::f( ). Such a THIS adjustment is called an early cast.
2. Access the VFT entry.
3. If the E and X subobjects are at different locations within the D object, adjust the THIS pointer to point to the E subobject. Such a THIS adjustment is called a late cast. A late cast may be required independently of whether an early cast is required.
4. Branch to the address of E::f( ) that is available in the VFT entry.

Steps 2 and 4 are common to the virtual dispatch mechanisms that described in more detail herein below and are collectively called the mandatory dispatch code. Whether an early cast (Step 1) and/or a late cast (Step 3) is performed may vary between virtual dispatch mechanisms. A virtual dispatch mechanism is the manner in which virtual dispatch is implemented for a particular object model.

An object model is defined in terms of how the following three questions are answered: How are objects laid out in memory, how are VFTs laid out in memory, and what code sequences are required to implement object oriented language features for a particular object and VFT layout? In addition to the object model, the implementation of virtual dispatch is affected by class inheritance properties.

Inheritance

In C++, a class may inherit another class. In C++ parlance, the inherited class is known as the base class and the inheriting class is known as the derived class. Inheritance is a powerful language abstraction that provides a mechanism for reuse by inheriting method implementations from base classes and a mechanism for extensibility by specializing an inherited class through overriding virtual functions or introducing new virtual functions. There are different types of inheritance in C++. In particular, a class may either inherit only one other class (single inheritance) or inherit multiple classes (multiple inheritance), and the inheritance may be specified as virtual (virtual inheritance).

In general, a class hierarchy graph, $\mathcal{H}$, for a C++ program may be defined as a tuple <N,E> where N is the set of nodes representing classes in the program and E is the set of directed edges representing inheritance relationships between the classes. If B is a direct base class of D, there is a directed edge from B to D in $\mathcal{H}$. If V is a direct, virtual base of class D, then the edge from V to D is labeled virtual. The virtual edges in a class hierarchy graph are illustrated with a v. There is a one-to-one correspondence between nodes in $\mathcal{H}$ and classes in the program. Each node in $\mathcal{H}$ is labeled with the virtual functions that the corresponding class declares. Declare(C, $\mathcal{H}$) is the set of all virtual functions declared in class C. As a convention, illustrations of class hierarchy graph label a node with the virtual functions that are declared in that node's corresponding class. for example in FIG. 2A. $f$ is introduced in class B and overridden in class D.

Figure 2A:
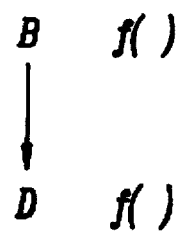
FIGS. 2A and 2B are diagrams respectively illustrating the property of single inheritance and the property of multiple and virtual inheritance.
Figure 2B:
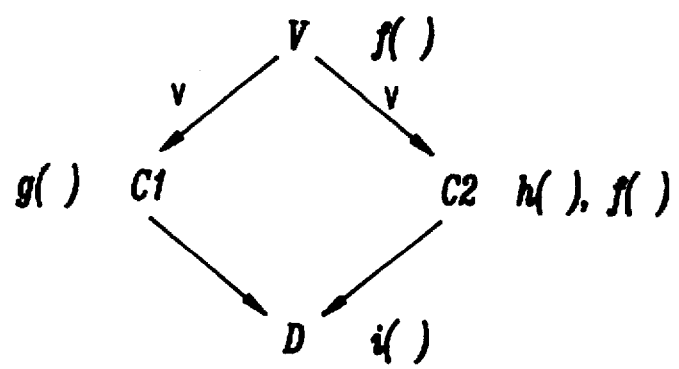

FIGS. 2A and 2B illustrate the three types of inheritance. In FIG. 2A, single inheritance is illustrated as a class hierarchy graph of two nodes B and D with an arrow going from B to D. This class hierarchy graph is interpreted as class D inherits class B, B is a direct, nonvirtual base class of D and D is a derived class of B. In FIG. 2B, multiple inheritance and virtual inheritance are illustrated in the diamond shaped class hierarchy graph. D is an example of a class that has multiple inheritance as it has two direct base classes C1 and C2. The edges that are labeled with v, from V to C1 and V to C2, are examples of virtual inheritance. Classes D, C1 and C2 virtually inherit class V, V is a virtual base of D, C1 and C2, and V is a direct, virtual base of C1 and C2.

The following definitions can be precisely stated in terms of the class hierarchy graph $\mathcal{H}$:

A class B is a direct, nonvirtual base class of D if there is an edge from B to D in $\mathcal{H}$ that is not labeled virtual. DNVBase(D, $\mathcal{H}$) is the set of direct, nonvirtual base classes of D.

A nonvirtual path from class B to class D is a path in $\mathcal{H}$ from the node labeled B to the node labeled D such that there is no virtual inheritance edge along this path.

A nonvirtual region for a class D, NVRegion(D, $\mathcal{H}$), is the set of classes such that for each class B in this set, there is a nonvirtual path in $\mathcal{H}$ from B to D. For convenience, D is included in the nonvirtual region of D.

A class V is a direct, virtual base of a class D if and only if there is an edge labeled virtual in $\mathcal{H}$ from V to D. DVBase(D, $\mathcal{H}$) is the set of direct, virtual base classes of D.

A virtual path from class V to class D is a path in $\mathcal{H}$ from the node labeled V to the node labeled D such that there is at least one virtual inheritance edge along this path.

A class V is a virtual base of D if there is a virtual path in $\mathcal{H}$ from V to D such that the first edge is labeled virtual. VBase(D, $\mathcal{H}$) is the set of virtual bases of D.

A virtual region for a class D, VRegion(D, $\mathcal{H}$), is the set of classes such that for each class V in this set, there is a virtual path in $\mathcal{H}$ from V to D.

Class B is a base class of class D if there is a virtual or nonvirtual path in $\mathcal{H}$ from the node labeled B to the node labeled D in $\mathcal{H}$. Base(D, $\mathcal{H}$) is the set of base classes of D. Class B is a base-or-self of class D if B is D itself or is a base class of D. Class D is a derived-or-self of Class B if B is a base-or-self of D.

An introducing class of a virtual functions $f$ is a class C that declares $f$ and no base class of C in $\mathcal{H}$ declares $f$.

A virtual function $f$ is visible at class C if C introduces $f$ or a base of C in $\mathcal{H}$ introduces $f$.

The defining class of a virtual function $f$ for a class C in $\mathcal{H}$ is a class B that defines $f$ such that B::$f$ is invoked for a fully derived C object. That is, for all paths from B to C no other class along any path defines $f$.

The frontier of a class C with respect to a specific virtual base V, Frontier(C,V, $\mathcal{H}$) is the set of classes in NVRegion(C, $\mathcal{H}$) that have V as a direct, virtual base. For example, in FIG. 2B, Frontier(D,V, $\mathcal{H}$) is {C1,C2}.

In the following discussion, the $\mathcal{H}$ argument is omitted when the class hierarchy graph is apparent.

Placing Base Class Subobjects

For any class B in NVRegion(D), the corresponding B subobject(s) and D's subobject always have the same fixed offset from each other within any object of a class that is a derived-or-self of D. In other words, the base subobjects for all classes that are in the nonvirtual region of a class D have their placement in a D subobject determined at compile-time, when the compiler sees D's class definition. This placement of subobjects will continue to hold for any object of a class that further derives from D. This property allows the same code sequence to convert a pointer to a D object or subobject to a pointer to such a B subobject, or vice versa. For this reason, the subobjects of the nonvirtual region of a class are collectively called the fixed (or nonvirtual) part of a fully derived object or subobject of that class.

On the other hand, for a class V in VRegion(D), V's subobject may not have the same offset in different fully derived objects. Consider the following example:

```
class V                         { int x; };
class C1:virtual V              { ... };
    // V is a virtual base of C1
class C2:virtual V              { ... };
    // V is also a virtual base of C2
class D:C1, C2                  {};
    // Where do we put V in D?
```

In this example, V is a virtual base of both C1 and C2. Assume that V is at the same fixed offset from the beginning of both C1 and C2. When D is derived from C1 and C2, then by definition of virtual bases, only one copy of the V subobject must exist in the D object. Where should we put the V subobject in the fully derived D object? Either the V in C1 moves, or the V in C2 moves, or both.

In general, the subobjects of classes in the virtual region of another class, say D, must be moveable in D's subobject because each must have a unique location within any object that contains D. The subobjects of the nonvirtual region of a virtual base V are collectively called the movable part of D due to V. In the above example, the V subobject is in the movable part of a fully derived C1 object, of a fully derived C2 object, and a fully derived D object. A unique copy of the V subobject exists in the C1, C2 and D objects. Since the offset of the V subobject from the C1 subobject in the C1 and D objects may differ, the offset to the V subobject must be maintained for each of these objects. Such an offset (which can also be a pointer to the virtual base subobject) is referred to as the virtual base pointer (VBPTR).

Object Components

The following are components that an object of a class may contain:

Base class objects: In order to support inheritance, an object must include all of its base class objects as its subobjects.

Data members: The data defined in the class must be laid out in an object of this class.

Virtual Function Table Pointer (VFT pointer or VFTPTR): The VFT pointer is a pointer to a Virtual Function Table (VFT). A VFT is essential for implementing the virtual dispatch mechanism that is required for the invocation of virtual functions.

Virtual Base Pointer (VBPTR): To access virtual base subobjects, an object must have pointers (or offsets) to them.

The last two components are compiler generated and are used to implement object oriented features.

An object's layout for any class can be divided into that object's fixed and moveable parts. The following equations recursively compute the components of the fixed and movable parts of a class C object when no assumptions about object layout are made:

$$FixPart(C) = \left( \sum_{B \in DNVBase(C)} FixPart(B) \right) +$$
$$data + VFTPTR + \sum_{V \in VBase(C)} VBPTR$$
$$MovePart(C) = \sum_{V \in VBase(C)} FixPart(V).$$

Due to VFTPTR and VBPTR sharing, an object's layout may affect the number of VFT pointers and VBPTRs that are required for a class.

Virtual Function Table (VFT) Layout

Virtual dispatch is efficiently implemented as an indirect function call through a table of function addresses, or VFT. A VFT's layout can be described in terms of its shape; that is, its width, the contents of each entry, and its height, the number of entries. Each VFT entry has at least a function address, and possibly a THIS adjustment value. The width of a VFT depends on whether a THIS adjustment value is stored in the VFT.

If the virtual function $f$ has an entry in all of C's VFTs (that is, all VFTs that can be pointed to by a C subobject's VFT pointer), then the offset of $f$ is required to be the same in all of C's VFTs. This property allows the same code sequence to invoke $f$ from a C object or from a C subobject in another object. Due to VFT pointer sharing, a VFT may have additional entries that result from combining multiple VFTs.

Framework for Determining the Layout of an Object's Components

Although we do not assume a particular object layout algorithm, we assume that whatever object layout algorithm is chosen, it is subject to the following constraints and it fits within the following framework.

Constraints

1. The VFT pointer of an object is at the lowest address end of its fixed part.
2. The fixed part of a class's object layout, and the class's VFT layout, is constant, regardless of the object that contains the subobject of that class.
3. The data members of an object are contiguously stored. We denote the contiguously stored contents as the object's contiguous component. This component does not include the VFT pointer, any VBPTR, or the direct, nonvirtual base class subobjects and bases in the virtual region of the object's class.
4. An object's movable part comes after the object's fixed part.

Framework

For any class C, laying out its fixed part requires that the following six questions be addressed:

1. What direct, base class shares its VFT pointer with C?
2. What base class shares its VBPTRs with C?
3. How are the subobjects of C's direct, nonvirtual base classes arranged within C?
4. Where is C's VFT pointer placed?
5. Where are C's VBPTRs placed?
6. Where is C's contiguous component placed?

The movable part of an object of class C consists of the fixed part of each of C's virtual bases. Since the virtual bases and their fixed part are accessed via the VBPTR, the order in which the fixed part of the virtual bases of C appear in the C object is unimportant.

The CSet object model answers the above six questions while laying out the fixed part of an object as follows: The algorithm below is used to determine what direct, nonvirtual base class C shares its VFT pointer with. This class is called the main direct, nonvirtual base class of C, and it is placed before the other direct, nonvirtual base subobjects that are arranged within C according to their declaration order. C's VFT pointer is placed at the beginning of its fixed part. C's nonvirtual subobjects are placed after its VFT pointer. The VBPTRs of C are placed after the nonvirtual subobjects. In the CSet implementation, C shares VBPTRs with those classes that are in C's frontier. C's contiguous component is placed at the end of its fixed part.

CSet Algorithm to Share VFT pointers

The CSet algorithm to select the main direct, nonvirtual base of a class C with which C will share its VFT pointer:

1. Select the first direct, nonvirtual base in declaration order such that this base has a VFT pointer and a VBPTR.
2. If (1) fails, select the first direct, nonvirtual base in declaration order that has a VFT pointer.
3. If (2) fails, select the first direct, nonvirtual base in declaration order that has a VBPTR.
4. If all of the above fail, C will not share its VFT pointer with a base class's subobject.

Object Creation

Objects are created in the execution of a C++ program. As described in *The Annotated C++ Reference Manual*, cited above, an object can be created in any one of the following ways:

- as a global variable;
- as a local variable;
- through explicit use of operator new;
- through explicit use of a constructor;
- as a temporary object.

It can also be created as part of another object (created in one of the ways above):

- as a data member of a class;
- as an object representing a base class.

A constructor is called when an object is created. A constructor for a given class can be explicitly defined as a member function with the same name as the class. The constructor uses the memory which is allocated for the object to build a representation of the object. The constructor builds the objects representing nonstatic data members, and the subobjects representing base classes. It sets VFT pointer fields to the appropriate VFTs, and sets virtual base pointer fields. In the CSet implementation, the order of object construction is:

1. Initialize virtual base pointers and, if this is the most derived class, construct virtual base subobjects (the virtual base constructors must not construct their virtual base subobjects).
2. Construct nonvirtual direct base subobjects.
3. construct data members.
4. Set up VFT pointers.
5. Execute user code in the constructor.

For setting VFT and virtual base pointers appropriately during the construction, the addresses of VFTs and virtual bases are passed as needed to constructors. Notice that constructors for base classes are called before the constructor for the derived class: an object of a derived class and its environment, including its VFT pointers, is built from base to derived classes.

For the class hierarchy graph of FIG. 2B, consider the construction of an object of class D. For the discussion of this example, we assume that objects share VBPTRs if and only if they share VFT pointers.

Figure 3A:
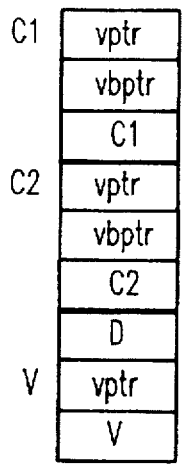
FIGS. 3A to 3F are diagrams illustrating object creation of a fully derived object D.

1. At compile-time, the layout for a fully derived object of class D has already been determined. Based on compile-time information, memory is allocated and partitioned as shown in FIG. 3A. At this point, the allocated memory locations are uninitialized. In FIGS. 3A to 3F, we denote an uninitialized VFT pointer as vptr, an uninitialized VBPTR as vbptr, and a set of uninitialized data members of a subobject C as C. When a pointer is set, we denote the location it references with an arrow to that location. When the data members of a class C have been constructed, we denote them as C data.

Figure 3B:
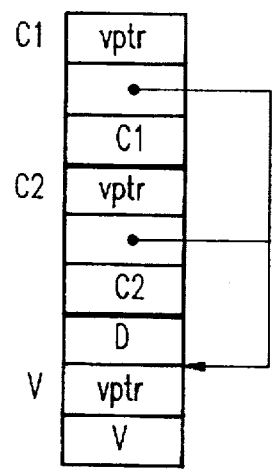
Figure 3C:
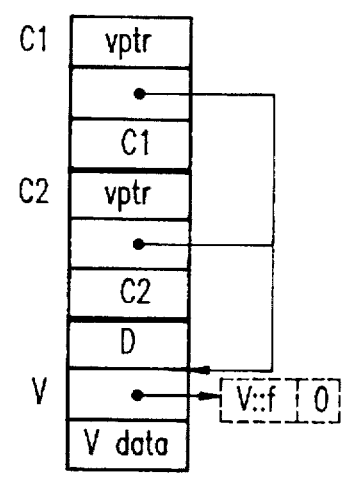
Figure 3D:
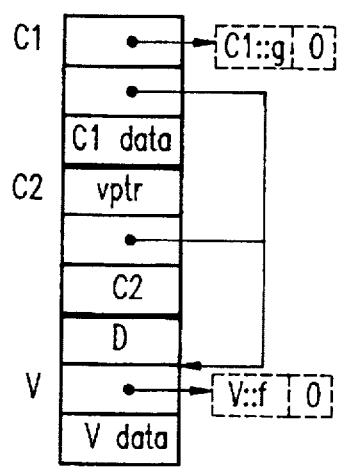
Figure 3E:
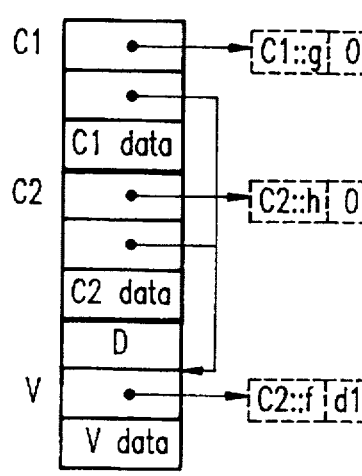
Figure 3F:
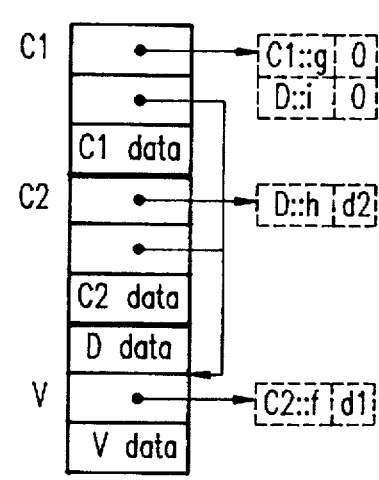

2. Virtual base pointers to the V subobject are initialized, as shown in FIG. 3B.

3. The V subobject is constructed. The constructor for V is passed the address of the VFT which corresponds to a V object, and so contains the function $V::f( )$. See FIG. 3C.

4. The subobject C1 is constructed. The constructor of C1 is passed the address of V, the address of the VFT which corresponds to a V subobject within a C1 object, and the address of the VFT which corresponds to a C1 object. Since $f( )$ is not overridden in C1, the VFT for V within C1 is the same as the VFT for V. See FIG. 3D.

5. The subobject C2 is constructed. The constructor of C2 is passed the address of V, the address of a VFT which corresponds to a V subobject within a C2 object, and the address of the VFT which corresponds to a C2 object. Since $f( )$ is overridden in C2, the VFT for V within C2 is not the same as the VFT for V within a fully derived V object. For the entry for $f( )$, in a fully derived C2 object, the THIS adjustment value, delta, that is used to perform a late cast, would indicate the offset between V and C2 in a fully derived C2 object, which we denote as $V.C_{C2}^{C2}$. But here, in the construction of a D object, the offset must indicate the offset between V and C2 in a fully derived D object, $V_D^{C2}$, which has a different value than $V_{C2}^{C2}$. Thus, the VFT whose address is passed is the same as that of a fully derived C2 object, except that its delta fields have been adjusted as needed to correspond to a fully derived D object. Such a VFT, which is needed for the construction process and may not correspond to the VFT for any fully derived object, is called a construction VFT. See FIG. 3E where $VD_D^{C2}$ is denoted d1.

6. Construction of data members of D. See FIG. 3F.

7. Reset VFT pointers within D. Assume that the example of FIG. 2B is augmented so that class D, in addition to defining the virtual function i( ), also defines the virtual function h( ). D shares its VFT pointer with C1, so this VFT pointer is set to a VFT containing g( ) and i( ). The base class C2 introduces the function h which D has overridden, so its VFT pointer is assigned the address of the appropriate VFT. See FIG. 3F where $C2_D^D$ is denoted d2.

8. Execute any code that might be in D's constructor.

Alternatives for Object and VFT Layout

All code sequences are presented in a pseudo assembly language for a generic RISC architecture. A code sequence's intent is to provide a flavor of the assembly code that would be required to implement a particular object-oriented feature. For example, in the code sequences that follow, we do not distinguish between data that resides in memory and data that resides in a register. In the pseudo assembler language, an operand enclosed in parentheses and followed by a displacement specifies the data whose location is computed from the sum of the contents of the operand and the displacement. For example, (VFTPTR)X is the data located at displacement X from the beginning of the VFT pointed to by VFTPTR.

Location of VBPTRs

Among others, two options can be identified for storing VBPTRs:

Option A1a: VBPTRs are stored in objects.
Option A1b: VBPTRs are stored in VFTs.

These options are mutually exclusive. Option A1a is known in the prior art. *The Annotated C++ Reference Manual*, cited above, illustrates this implementation. Since the number of objects is usually greater than the number of VFTs, it may be space efficient to store the pointers to virtual base subobjects in the VFTs pointed to by an object, rather than in the object itself. If VBPTRs are in VFTs, a VBPTR must be an offset. Whereas if VBPTRs are in objects, they may be either offsets or pointers. For this discussion, we assume VBPTRs are offsets. When VBPTRs are stored in VFTs, the VBPTRs and virtual function entries may be interleaved, and accessing a VBPTR requires an extra memory load. Although storing VBPTRs in VFTs saves space, accessing the VBPTR requires additional time to first load the VFT pointer to the VFT that has the VBPTR.

A class is vftptr-owning if the fixed part of the class's object contains a VFT pointer.

Sharing VFT pointers

The advantages of sharing VFT pointers are:

There is one less VFT pointer in the object every time there is sharing.

There may be fewer VFT entries because the entries common to the VFT pointed to by the sharing base subobject and the VFT pointed to by the derived object need to be represented only once.

There may be fewer VBPTRs because the VBPTRs common to the sharing base subobject and the derived object need to be represented only once (see Alternative A3).

Late casts may be eliminated.

Option A2a: Share VFT pointer only with a direct, nonvirtual base, if it exists. This option excludes sharing a VFT pointer with a direct, virtual base. This option is known in the prior art. Most current C++ compilers assume that a subobject will share its VFT pointer with the VFT pointer of one of its direct, nonvirtual base classes. *The Annotated C++ Reference Manual*, cited above, illustrates this implementation.

Option A2b: Share VFT pointer with a direct, nonvirtual base, and if there exists no such nonvirtual base, share VFT pointer with a direct virtual base, if any. This option is one aspect of the present invention. It is not always possible to share a VFT pointer with a virtual base; in particular, with multiple inheritance. Under either one of two conditions, a class can share its VFT pointer with a direct, virtual base class.

Conditions for VFT pointer Sharing With a Direct, Virtual Base

Condition I: The virtual base is vft-vbase-ptrs-only. A class is vft-vbase-ptrs-only if the fixed part of its object only contains a VFT pointer and zero or more virtual base pointers.

Let V be a vft-vbase-ptrs-only class in DVBase(C). In this case, the fixed part of V consists only of a VFT pointer and zero or more virtual base pointers. The effect of C sharing these pointers with V is that the fixed part of V has been moved to the fixed part of C, thus eliminating V's subobject in the moveable part of C. Here are some examples of vft-vbase-ptrs-only classes, assuming that VBPTRS are stored in objects (Option A1b).

| | |
|---|---|
| class W { virtual f() ; }; | // W is vft-vbase-ptrs-only |
| class X { int i; }; | // X is not vft-vbase-ptrs-only |
| class Y:virtual X { }; | // Y is not vft-vbase-ptrs-only |
| class Z:virtual X, Y; { virtual f(); }; | // Z is vft-vbase-ptrs-only |

Y is not vft-vbase-ptrs-only because it is not vftptr-owning.

A class is vftptr-only if the fixed part of its object only contains a VFT pointer. Considering the same examples as above, but assuming that VBPTRS are stored in VFTs (Option A1b), the classes W, Y, and Z are vftptr-only, and X is not. Z contains Y's subobject in its fixed part, but Y is vftptr-only.

Condition II: The virtual base is vftptr-owning-but-not-only and a derived class is vftptr-only. A class is vftptr-owning-but-not-only if it is vftptr-owning and it is not vftptr-only.

Let V be the vftptr-owning-but-not-only class in DVBase (C) and C be vftptr-only. In this case, the effect of C sharing its VFT pointer with V is that the fixed part of C overlaps with its moveable part.

Assume that Condition II holds for a fully derived C object that shares its VFT pointer with V, a direct, virtual base of C. It may not be the case that V and C will continue to share their VFT pointer in an object of class D that derives from C. The following necessary condition identifies if it may be the case that C and V continue to share their VFT pointer in a fully derived D object:

If there exists any derived class X of C in D such that the C subobject shares its VFT pointer with the X subobject in a fully derived D object, then X must be vftptr-only.

Consider a fully derived class D object. Let C be a vftptr-only class in Frontier(D,V,$\mathcal{H}$) that shares its VFT pointer with a virtual base V in a D object. There can be only one such frontier class. The following two constraints define the object layout of a fully derived D object.

1. C must be the last word of the fixed part of a D object. If C is a direct base of D, then (1) is sufficient.

2. If C is not a direct base of D, choose a direct base E of D such that E derives from C and C is the last word of the fixed part of the E subobject (there must be such an E). All subobjects that correspond to direct non-virtual bases of D (excluding the E subobject) and D's data must be placed before the E subobject.

For both Condition I and Condition II, the C subobject that shares its VFT pointer with a virtual base, V, retains its VBPTR to V: the VBPTR is required since in a derived class of C, C may not share its VFT pointer with V. That is, VFT pointer sharing with a virtual base (Option A2b) may not be permanent. In addition, if C does not continue to share its VFT pointer with V in a derived class D, C's VFT in a D object will continue to have entries for all of the virtual functions in V's VFT.

EXAMPLE 1

Condition I VFTPTR-Sharing

Consider the following example in which the class hierarchy graph is presented in FIG. 2B:

```
class V                    { virtual f () ; }
  // V is vft-vbase-ptrs-only
class C1:virtual V         { virtual g(); int i; }
  // C1 is vftptr-owning-but-not-only
class C2:virtual V         { virtual h();
                             virtual f () ; int j; }
  // C2 is vftptr-owning-but-not-only
class D:C1, C2             { virtual i(); int k; }
  // D is vftptr-owning-but-not-only
```

Figure 4:
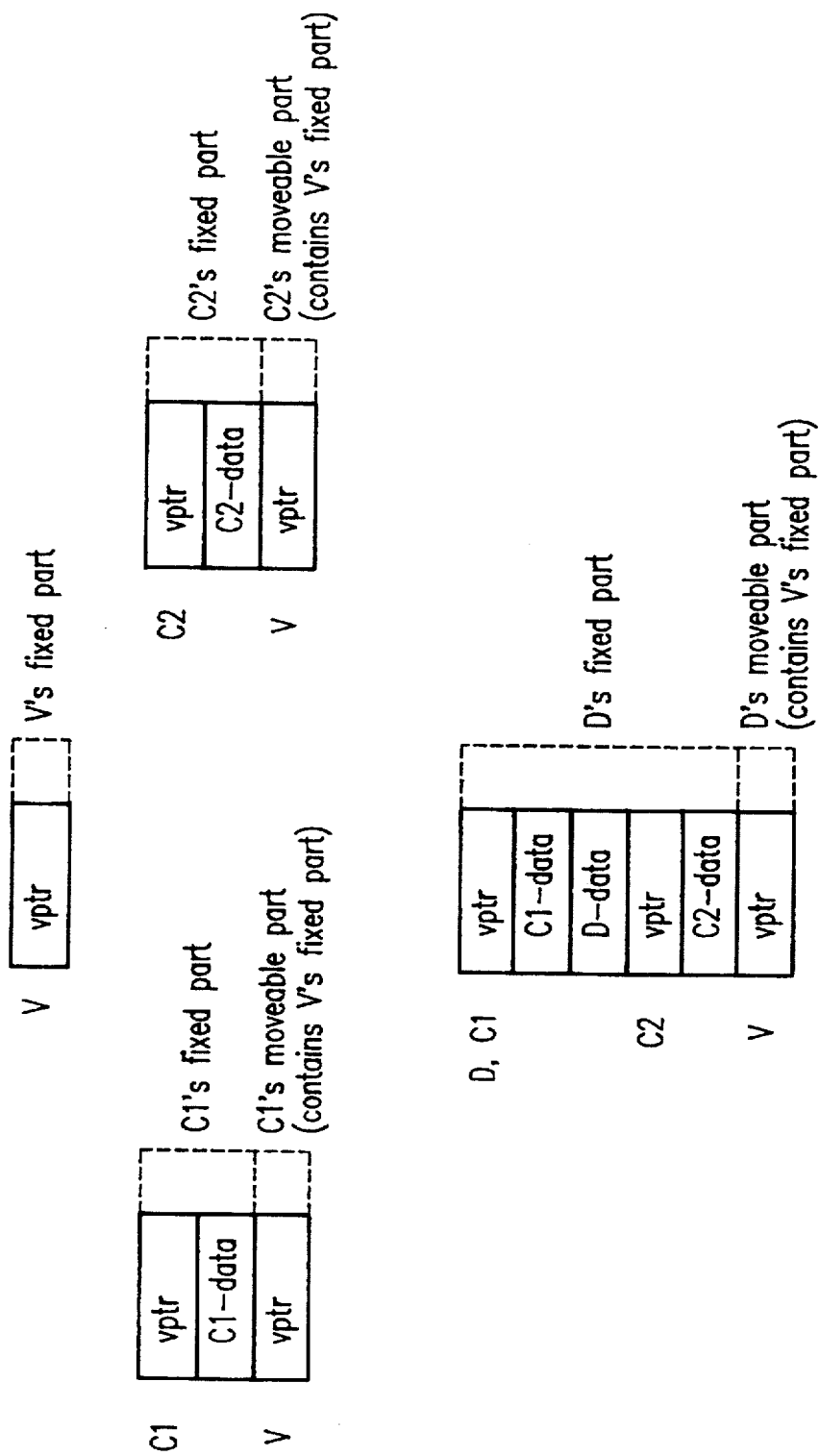
FIG. 4 is a diagram illustrating object layouts for a first example using virtual function table (VFT) pointer sharing.

FIG. 4 illustrates the object layouts with Option A2a, when VFT pointers are shared with direct, nonvirtual bases. In all figures that illustrate object layouts, the name of a class is used to label where its subobject is placed, and most of a subobject's detailed content is hidden. For example, a subobject of a class, say B, will be represented by a VFT pointer (which is denoted as vptr) and a B-part that consists of all of B's contiguous component. In FIG. 4, only D and C1 share a VFT pointer, and the total number of VFT pointers of fully derived C1, C2, and D objects are two, two, and three respectively.

Figure 5:
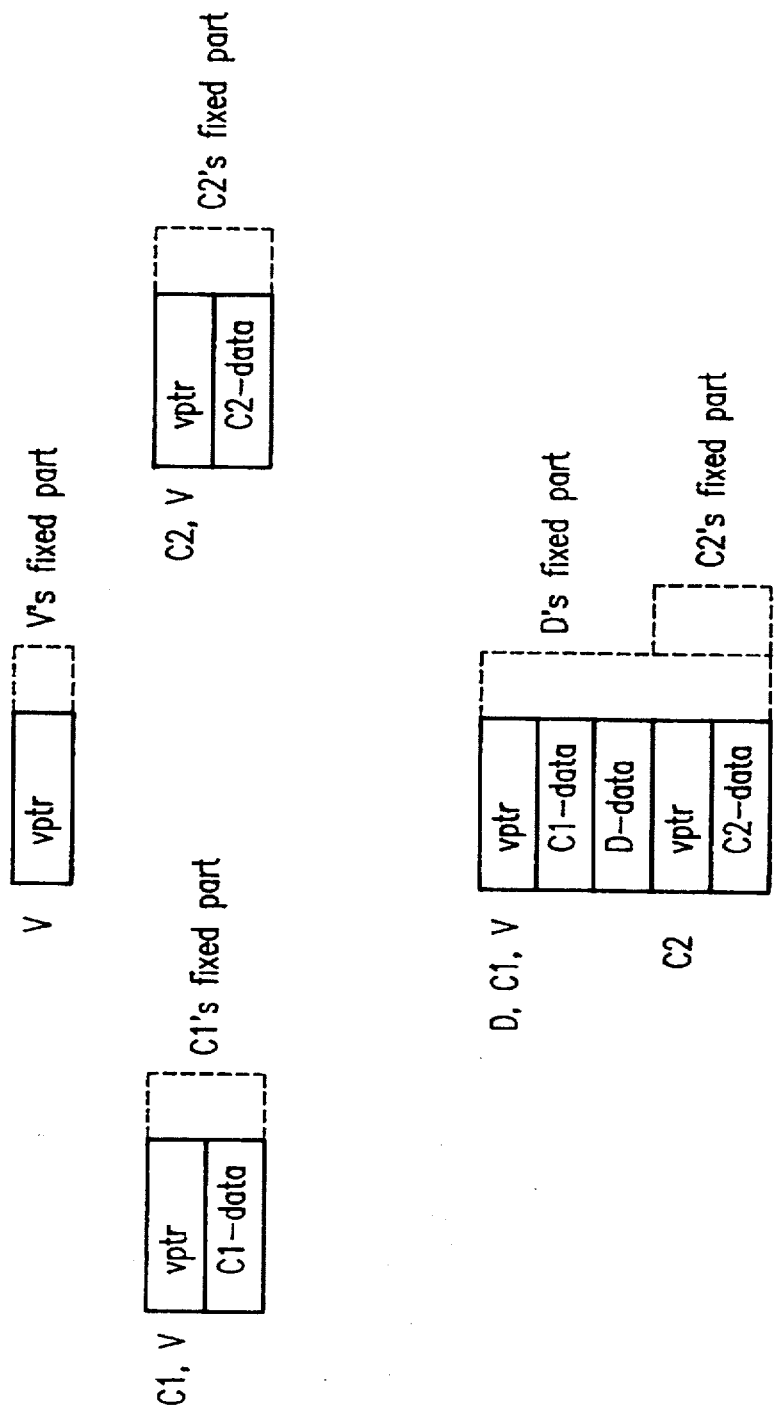
FIG. 5 is a diagram illustrating object layouts for the first example using a first condition of VFT pointer sharing with a virtual base.

Since V is vft-vbase-ptrs-only, Condition I VFT pointer sharing of Option A2b can occur between the V subobject and both the C1 and C2 subobjects. FIG. 5 illustrates the object layouts with Condition I VFT pointer sharing of Option A2b. The figure illustrates that the moveable parts for fully derived C1, C2, and D objects are eliminated. In addition, in the layout for a D object, the C2 and V subobjects no longer share VFT pointers. In general, sharing a VFT pointer with a direct, virtual base may not be permanent. The total number of VFT pointers needed for fully derived C1, C2, and D objects are reduced to one, one, and two respectively.

EXAMPLE 2

Condition II VFTPTR-Sharing Although a vftptr-owning-but-not-only initial base is not as flexible as a vftptr-only virtual base, in so far as placing the virtual base subobject is concerned, there is still an opportunity for VFT pointer sharing. Consider this example when VBPTRs are stored in VFTs (Option A1b) in which the class hierarchy graph for this example is shown in FIG. 2B:

```
class V                    { unsigned bitflags;
                             virtual f (); }
  // V is vftptr-owning-but-not-only
class C1:virtual V         { virtual g(); };
  // C1 is vftptr-only
class C2:virtual V         { int j; virtual h();
                             virtual f (); };
  // C2 is vftptr-owning-but-not-only
class D:C1, C2             { int k; virtual i(); };
  // D is vftptr-owning-but-not-only
```

Figure 6:
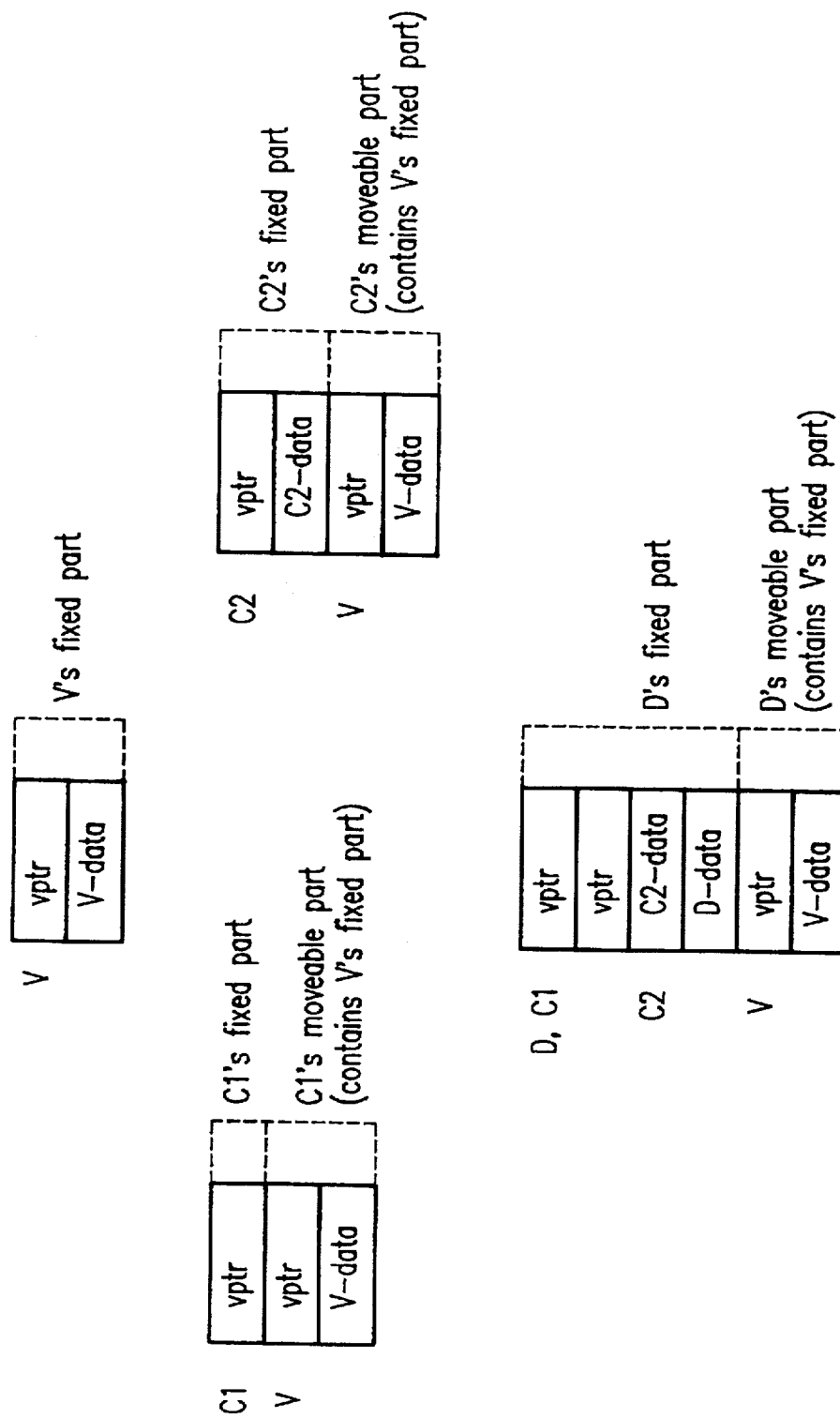
FIG. 6 is a diagram illustrating object layouts for a second example using the VFT pointer sharing.

FIG. 6 illustrates the object layouts when VFT pointers are only shared with nonvirtual base classes (Option A2a), and when the CSet Algorithm to share VFT pointers is used. The number of VFT pointers for fully derived C1 and D objects are two and three respectively.

Figure 7:
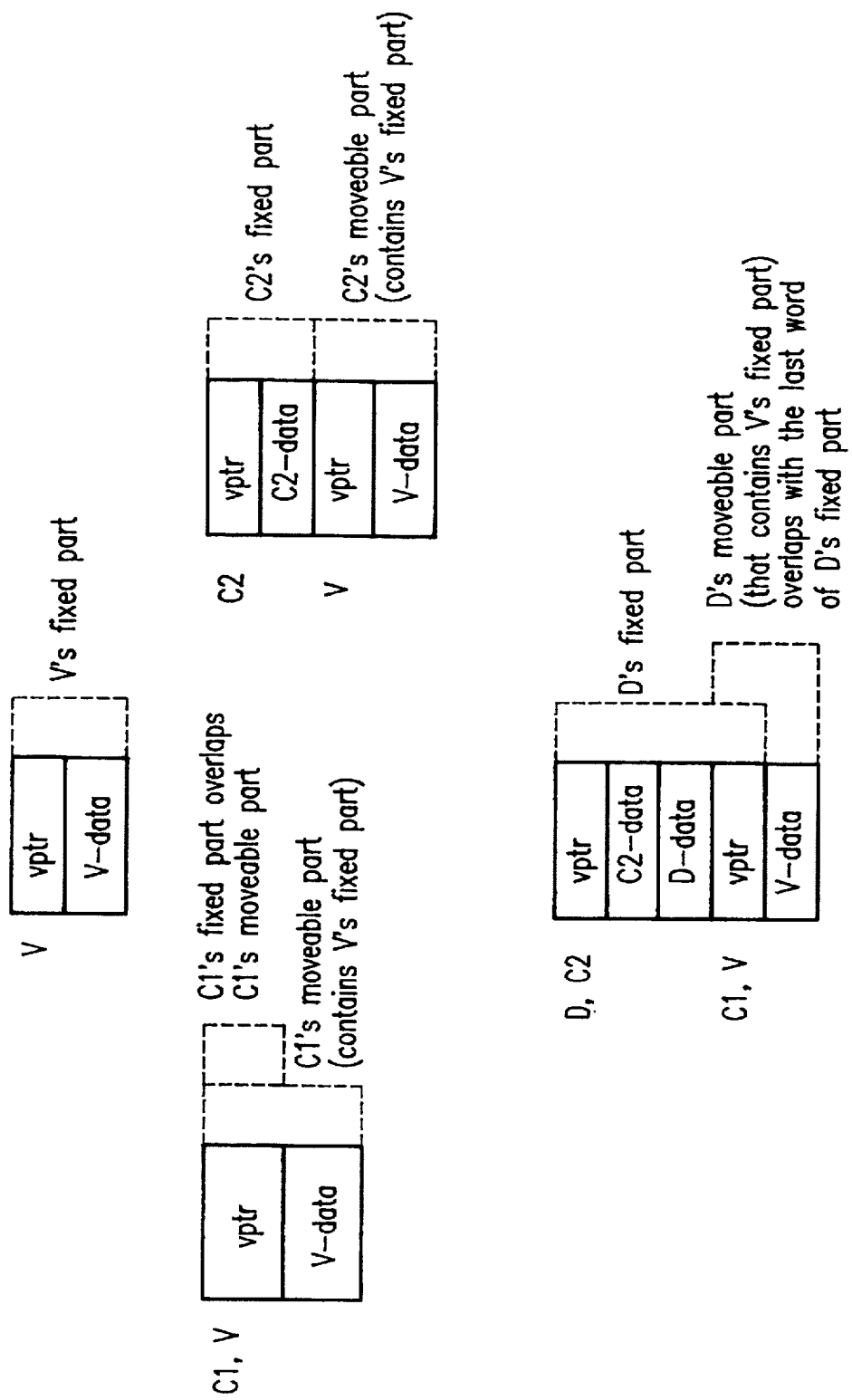
FIG. 7 is a diagram illustrating object layouts for the second example using a second condition of VFT pointer sharing with a virtual base.

FIG. 7 presents the object layouts with Condition II VFT pointer sharing for Option A2b. Both C1 and C2 are in the set Frontier(D,V). C1 is vftptr-only; V is vftptr-owning-but-not-only. While the sizes of V and C2 fully derived objects are unchanged, the total number of VFT pointers required for fully derived C1 and D objects are each reduced by one to one and two respectively. Observe that in FIG. 7 the CSet Algorithm to share VFT pointers is not used since D shares its VFT pointer with C2 instead of C1.

There are examples from real code where the opportunity for sharing VFT pointers with virtual base classes (Option A2a) occurs. On the one hand, interface classes typically contain no data and result in vft-vbase-ptrs-only virtual base classes (Condition I). On the other hand, it is not uncommon, for efficiency reasons, to have a bitflag word in the base class of a class hierarchy for characterizing the objects in the hierarchy. This makes the root virtual base class vftptr-owning-but-not-only (Condition II).

Sharing VBPTRs with Base Classes

A class C shares a VBPTR with a base class B if C uses B's VBPTR without introducing its own VBPTR. An option for sharing VBPTRs in a class C object with its base classes may be as follows:

Option A3a: C shares VBPTRs with those base classes that share their VFT pointer with C.

This option reduces space by reducing the number of VBPTRs. Just as VFT pointer sharing with a direct, nonvirtual base is prior art, so is Option A3a in this context, as illustrated by *The Annotated C++ Reference Manual*. We introduced VFT pointer sharing with a direct virtual base in Option A2b. In the context of Option A2b, Option A3a is novel. Under Condition I of Option A2b, virtual base pointers can also be shared. Under Condition II of Option A2b, VBTRs are not stored in objects. In this case also, VBPTRs can be shared when VFT pointers are shared. In-object VBPTR sharing is possible, under conditions analogous to Condition II, when the VFT pointer (VFTPTR) and VBPTRs are stored contiguously in the fixed part of an object and treated as a "big VFTPTR". This scheme requires that the VFTPTR/VBPTRs segment be stored at the lowest address end of the fixed part of an object, and that the shared VFTPTR/VBPTRs be stored contiguously at the high address end of this segment, with the VFTPTR stored at the segment's highest address end. Note that such a layout would violate the first constraint that we posed for object layout: the VFTPTR of an object is at the lowest address end of its fixed part. A precise formulation of this VBPTR-sharing scheme would involve suitably redefining the Condition II compatibility criteria and carefully choosing the VFTPTR/VBPTR layout. The intuition is that, regarding the VFTPTR/VBPTR segment as a "big VFTPTR", the "VFTPTR" is still at the lowest address end of the fixed part, and we can overlay the "VFTPTR" of a vftptr-owning-but-not-only virtual base Von top of a vftptr-only derived class B, since the size of B's "VFTPTR" is equal to or bigger than that of V's.

Placement of Late Cast THIS Adjustments

This alternative presents two options that affect VFT width.

Option A4a: Store late cast THIS adjustments in the VFT entries.

In this approach, a VFT entry contains two items: the address of the function to be invoked at run-time, VFaddr, and the THIS adjustment value, delta, that is used to perform a late cast. During virtual dispatch, the late cast is performed by loading delta and then adding it to the THIS pointer. The following code sequence is used at run-time to invoke the proper virtual function by loading the VFaddr and delta from a VFT pointed to by a VFT pointer.

```
        load vftptr, this
                // load vftvptr from this pointer
        load delta, (vftptr)Y
                // late cast: load delta from VFT entry
        load VF_addr, (vftptr)X
                // load VF_addr from VFT entry
        add delta, this
                // late cast: adjust this pointer by delta
    b   VF_addr
                // branch to VF_addr
```

Option A4b: Store a late cast's THIS adjustment in a snippet of code called THUNK (or trampoline) code.

In this approach, a VFT entry contains exactly one item: either the address of the function when no late cast is required (i.e., delta is zero), or the address of the thunk code, when a late cast is required (i.e., delta is non-zero). The THUNK code simply performs the late cast and then transfers control to the function address. When no late cast is required, the code sequence during virtual dispatch is:

```
        load vftptr, this
                // load vftptr from this pointer
        load VF_addr, (vftptr)X
                // load VF_addr from VFT entry
    b   VF_addr
                // branch to VF_addr
```

When a late cast is required, the code sequence during virtual dispatch is:

```
        load vftptr, this
                // load vftptr from this pointer
        load thunk_addr, (vftptr)X
                // load thunk address from VFT entry
    b   thunk_addr
                // branch to thunk
        add delta, this
                // thunk: add delta to this pointer
    b   VF_addr
                // thunk: branch to VF_addr
```

Both Options A4a and A4b are widely known prior art. *The Annotated C++ Reference Manual*, cited above, illustrates this implementation. All three virtual dispatch code sequences that are presented above require the same three mandatory dispatch code instructions that correspond to the code sequence for A4b, when no late cast is performed. The other two virtual dispatch code sequences include, in addition to mandatory dispatch code, a late cast. Although both alternatives affect code size, the A4b alternative allows thunk code to be shared between virtual function call sites when a late cast is required and the late cast values are the same, while the A4a alternative requires late cast code at every call site.

Determining VFT entries

This section presents four options which determine the virtual function entries that go into the VFT of a class and hence affect VFT height. The first two options are:

Option A5a: A VFT for a class contains entries for all virtual functions that are visible at that class.

Option A5b: A VFT for a class contains entries for all virtual functions that are introduced in that class.

In the A5a alternative, if multiple or virtual inheritance occurs, the number of VFT entries that are duplicated in multiple VFTs of an object may increase significantly as the depth of inheritance increases. In contrast, the total number of VFT entries for A5b is equal to the total number of virtual functions introduced in the C++ program. When Option A5b is combined with Option A2b, sharing a VFT pointer with a direct virtual base, VFT entries may be duplicated. The total number of VFT entries for the A5b alternative will never be more than the total number of VFT entries for the A5a alternative, and is expected to be less if multiple or virtual inheritance occurs.

Although the A5b alternative may reduce VFT size, the virtual dispatch mechanism that is needed for A5b may require additional space and time overhead to find the virtual function entry in the introducing base class's VFT; that is, an early cast may be required. An early cast is always a cast to a base class's subobject. The space overhead is the extra instructions at each virtual function call site that requires an early cast, and the time overhead is the execution of these instructions. In contrast, the A5a alternative never requires an early cast, although a late cast may be needed.

For RISC architectures, such as the PowerPC® microprocessor, that have a compound load and add instruction, an early cast may not require additional space or time overhead. In particular, if an early cast does not require the use of a VBPTR to access a base class (EarlyNVCast), the cast can be combined with loading the VFT pointer. Alternatively, if an early cast must access a VBPTR (EarlyVCast), the code sequence depends on where VBPTRs are stored. If VBPTRs are stored in objects (Option A1a), then the code sequence for a EarlyVCast is:

```
        load vbptr, (this)X
                // load vbptr from this pointer
        add vbptr, this
                // adjust this pointer with vbptr
```

The code sequence first loads the VBPTR from the THIS pointer, and then adds the VBPTR offset to the THIS pointer. If VBPTRs are implemented as pointers, not offsets, then the second instruction in the code sequence would be a load to adjust the THIS pointer. On the other hand, if VBPTRs are stored in VFTs (Option A1b) then the code sequence for a EarlyVCast is:

```
        load vftptr, this
                // load vftptr from this pointer
        load vbptr, (vftptr)X
                // load vbptr from vft
        add vbptr, this
                // adjust this pointer with vbptr
```

The code sequence requires an additional load to first load the VFT pointer from the THIS pointer and to then load the VBPTR from the VFT before adjusting the THIS pointer.

The next two options eliminate the need for a EarlyVCast by increasing the number of VFT entries that are required by Option A5b. These options are both aspects of the present invention.

Option A5c: A VFT for a class contains entries for all virtual functions introduced in that class, and for all virtual functions introduced in the virtual region of that class.

Option A5d: A VFT for a class C contains entries for all virtual functions introduced in C. In addition, if V is a direct virtual base of C, and V is not a direct virtual base of any other base of C, then C's VFT contains an entry for all virtual functions introduced in NonvirtualRegion(V).

Options A5c and A5d guarantee that if a virtual function *f* is introduced in the virtual region of class C, there will be a class in C's nonvirtual region whose VFT has an entry for $f$. Hence at most an EarlyNVCast is required to locate the VFT entry for $f$. Option A5d never has more VFT entries than Option A5c.

The relationship between the A5 options, in terms of the number of VFT entries, is: A5a≧A5c≧A5d≧A5b. If a class has no virtual base classes, then Options A5c and A5d will not duplicate entries for any virtual functions in the VFTs for a fully derived object of this class; that is, they will have the same number of VFT entries as Option A5b.

Given Example 1, whose class hierarchy graph is shown in FIG. 2B. C1 and C2 virtually inherit V, and D nonvirtually inherits C1 and C2. Consider the virtual function call e→$f$( ) such that D is the static and the dynamic type of e, V is the introducing class of $f$, and $f$ is overridden by C2. The VFT layouts for the four A5 Options for this example are examined. For the sake of this discussion, time overhead is compared by counting the number of memory loads that are required to execute early cast and mandatory dispatch code. Late cast time overhead will be discussed shortly; for the moment, we are not concerned with Option A4. That is, we are not concerned with where the late cast THIS adjustment is located. We also assume that the address of an object is already stored in a machine register.

Assume for the moment that VBPTRs are stored in object (Option A1a). FIGS. 8A and 8B respectively illustrate VFT and object layouts for Options A5a and A5b when VBPTRs are stored in objects. In FIG. 8A, the number of VFT entries is seven. In Option A5a, the VFT for a class has an entry for every virtual function visible at that class. In this case, although the space overhead due to the number of VFT entries increases over other options, the virtual dispatch is as time efficient as any of the other options since no early casts are required. FIG. 8A illustrates that seven VFT entries are required for Option A5a, and that two memory loads are needed for this option to invoke $f$: one to load the VFT pointer and one to load the VFT entry from the VFT pointer. Notice that in Option A5a, C2::$f$ has a total of three entries: one entry in each of the V, C2, and D VFTs; and C2::h has an entry in both C2 and D's VFTs. When we call $f$ from a pointer to the D subobject, the entry for C2::$f$ is already in D's VFT, so no early cast is required.

Option A5b is shown in FIG. 8B where the number of VFT entries is four. In Option A5b, each virtual function that is introduced in a base-or-self has only one VFT entry that is in the VFT for that base-or-self. Although this option is space efficient, calling $f$ from a pointer to the D subobject, requires an extra memory load since the entry for $f$ is in V's VFT and V is a virtual base of D. FIG. 8B illustrates that four VFT entries are required for Option A5b, and that three memory loads are needed for this option to invoke $f$ one to load V's VBPTR, one to load V's VFT pointer, and one to load $f$'s VFT entry from the VFT pointer.

Now suppose that the VBPTRs are in VFTs (Option A1b), and that VFT pointers can be shared with virtual base classes (Option A2b). The object and VFT layouts for Options A5a and A5b are respectively shown in FIGS. 9A and 9B. In FIG. 9A, the number of VFT entries for Option A5a is six, with two memory loads to invoke $f$ one to load VFT pointer to D's VFT, and one to load C2::$f$ from D's VFT. Option A5a still takes the same two memory loads, because D's VFT has an entry for every virtual function that is visible at D, and one VFT entry is eliminated by V sharing a VFT pointer with D and C1. In FIG. 9B, Option A5b has four VFT entries but four memory loads to access $f$: one to load VFT pointer to D's VFT, one to load V's VBPTR from D's VFT, one to load VFT pointer to V's VFT, and one to load C2::$f$ from V's VFT. Option A5b, in contrast with Option A5a, requires two extra loads since accessing a VBPTR requires loading the current VFT pointer, and then loading the VBPTR from the VFT pointed to by the VFT pointer. FIG. 9B illustrates that Option A5b requires four VFT entries and four loads, twice as many loads as Option A5a. Even though D and V share VFT pointers with Option A2b, accessing V's VFT requires that the VBPTR to V is accessed since sharing VFT pointers with virtual bases may not be permanent.

Options A5c or A5d require only two memory loads (the same number of memory loads as Option A5a) to access $f$'s VFT entry from a D fully derived object, but require five VFT entries (one more than Option A5b). With Option A5b, D's VFT does not have an entry for $f$; however, with Options A5a, A5c, or A5d, D's VFT does have an entry for $f$. Nevertheless, unlike Option A5a, Options A5c and A5d do not have a entry in D's VFT for h. They only have an entry for h in C2's VFT. FIG. 10 illustrates when Options A5c and A5d are combined with Options A1b and A2b, five VFT entries are required and that two memory loads are needed to invoke $f$: one to load the VFTPTR, and one to load the VFT entry from the VFTPTR.

Option A5c and Option A5d differ in that sometimes Option A5d requires fewer VFT entries than Option A5c. Consider the following example:

| class V | {virtual f(); }; |
| class B: | virtual V {int i;}; |
| class A | {virtual g(); }; |
| class D: | virtual V, A, B {int j;}; |

Figure 11:
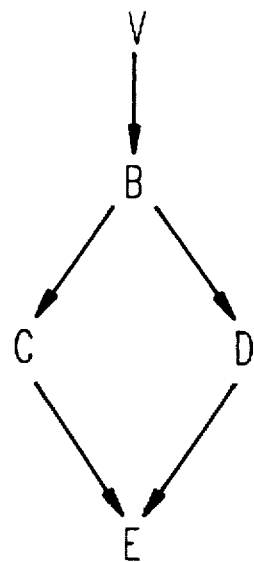
FIG. 11 is a diagram illustrating the class hierarchy graph for an example comparing two virtual function entry options.

FIG. 11 gives the class hierarchy graph for this example.

Figure 12A:
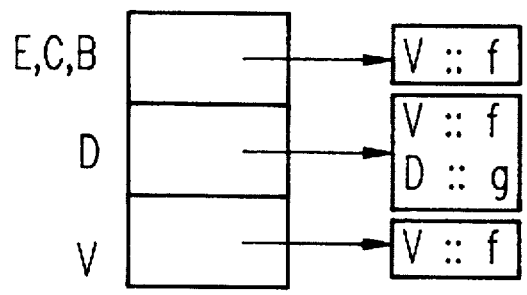
FIGS. 12A and 12B are diagrams illustrating VFT and object layouts for two virtual function entry options.
Figure 12B:
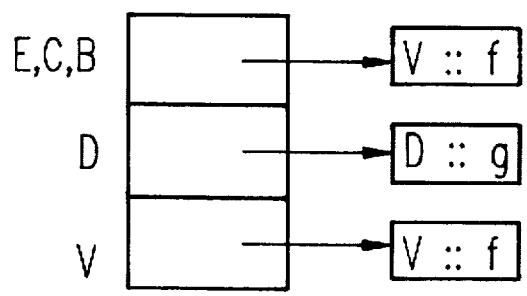

Consider a fully derived D object. With Option A5c, the VFT shared by classes D and A has an entry for V::$f$( ), as shown in FIG. 12A. But with Option A5d this VFT does not, as shown in FIG. 12B, even though V is a direct virtual base of D. Consider the virtual function call p→$f$( ) such that D is the static and dynamic type of p. With Option A5c, no early cast is required to execute the call. With Option A5d, an EarlyNVCast from D to B is required. We have seen that, for some architectures, an EarlyNVCast may not incur any space or time overhead. In any case, Option A5d, like Option A5c, avoids an EarlyVCast, and with fewer VFT entries in some cases.

Smart Virtual Dispatch

Until now, the discussion has focused on the time overhead required to execute early cast and mandatory dispatch code. Now we consider the time overhead for late casts. Given a virtual function call, p→$f$( ), let S be the static type of the object pointed to by p, let D be its dynamic type, and let I be the class which introduces $f$. Suppose the actual function invoked at the call site is E::$f$( ), the function $f$ defined in class E.

Option A6a: Perform an early cast to the subobject, X, in the D object whose VFT contains the entry that has the address of E::$f$( ).

The subobject to which the early cast is performed under Option A6a depends on the option chosen for determining VFT entries. With Option A5a, no early cast is needed (i.e., X=S). With Option A5b, the early cast is to the introducing class (X=I). With Option A5c, X=I if I is in the nonvirtual region of S; otherwise, X=S. With Option A5d, X=I if I is in the nonvirtual region of S; otherwise, X can be any class in the nonvirtual region of S that has I as a direct virtual base and has no base class that has I as a direct virtual base.

Option 6b presents a smart virtual dispatch that eliminates late casts where possible by performing intelligent EarlyN-VCasts. This option is an innovation of this invention.
Option A6b: A smart virtual dispatch performs an EarlyN-VCast to the most derived subobject, if it exists, that is a base-or-self of the static type and that defines the virtual function and has an entry for the virtual function in its VFT. The EarlyNVCast requires that the derived subobject is in the nonvirtual region of the static type.

Smart virtual dispatch can be combined with Options A5a, A5c, or A5d. Combining smart virtual dispatch with Option A5b provides no advantage as there is only one VFT that contains an entry for a virtual function and that VFT may not be located in a class's nonvirtual region. Given a virtual function call, p→f( ), let S be the static type of the object pointed to by p, D be its dynamic type, and Y be the set of classes such that Class C is in Y if and only if C is a base-or-self of D and C is not a base-or-self of S. When combined with Option A5a, smart virtual dispatch guarantees the property that if no class C in Y overrides $f$, and there is a definition of $f$ in S's nonvirtual region, then no late cast will be required. Smart virtual dispatch could be combined with other options for determining VFT entries such that these options reduce the number of VFT entries that are required and guarantee this property.

Returning to Example 1, assume that Option A4b and Option A6a are used so that a virtual dispatch mechanism performs a late cast only when a late cast is required. The virtual dispatch mechanisms for Options A5a, A5b, A5c, and A5d all require a late cast to invoke $f$ from a D subobject since the defining class of each entry for $f$, C2, does not share its VFT pointer with D. Only Option A6b, in combination with Options A5a, A5c or A5d, does not require a late cast: the virtual dispatch mechanism for Option A6b will early cast to C2's subobject. Since C2 is the most derived class that is a base of D that defines $f$ and has an entry for $f$ in its VFT, C2's definition of $f$ is invoked for a fully derived D object. After the early cast, the THIS pointer is already pointing to the C2 subobject and no late cast is required. Note that if smart virtual dispatch were combined with Options A5c and A5d, the late cast could be avoided. In general, combining smart virtual dispatch with Options A5c and A5d may not eliminate a late cast that can be eliminated when Option A6b is combined with Option A5a.

IN SUMMARY

An object model (or model for short), M, can be constructed by choosing one option from each of the alternatives that are presented in Sections 3.1 through 3.5. For example, *The Annotated C++ Reference Manual* model is <A1a, A2a, A3a, A4a, A5a, A6a>.

The interaction of alternatives with each other can be summarized as follows: Alternative A2 affects the alternatives: A3, sharing VBPTRs with base classes; A4, placement of late cast THIS adjustments; and A5, determining VFT entries, as follows. Alternative A2 has a direct effect on Option A3a since this option involves VBPTR sharing with those base classes that share VFT pointers. If two classes share a VFT pointer, then a subobject cast from a subobject of one class to a subobject of the other is a NO-OP; that is, a THIS pointer adjustment is not required. Alternative A2 results in having more THIS adjustment values equal to zero, which has a direct effect on Option A4b since this option only performs late casts when they are required. Note that a late cast is a subobject cast that is performed during virtual dispatch. Alternative A2 has a direct effect on Alternative A5's options A5a, A5c, and A5d, since the combined VFT of classes that share a VFT pointer does not have duplicate entries for a virtual function.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method of modeling C++ objects in an implementation of the C++ programming language in which a class in the C++ language may inherit another class, an inherited class being known as a base class and an inheriting class being known as a derived class, a class hierarchy graph, $\mathcal{H}$, for a C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a nonvirtual region for a class D is the set of classes such that for each class B in this set, there is a nonvirtual path in $\mathcal{H}$ from B to D, a class V is a direct, virtual base of a class D if and only if there is an edge labeled virtual in $\mathcal{H}$ from V to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a virtual region for the class D being a set of classes such that for each class V in the set, there is a virtual path in $\mathcal{H}$ from V to D, said computer implemented method comprising the steps of:

laying out a virtual function table (VFT) in computer memory having a number of entries, said virtual function table entry having at least a function address and supporting a virtual dispatch mechanism;

laying out an object in computer memory to include as components of the object all base class subobjects of the object, data members defined in the class, and a VFT pointer to the VFT for implementing the virtual dispatch mechanism required for virtual functions;

laying out virtual base pointers in computer memory to access virtual base subobjects;

sharing with a derived class D a VFT pointer of a direct, virtual base class V only when the virtual base class V has a fixed part of its object that contains only a VFT pointer; and sharing with a derived class D a VFT pointer of a direct, virtual base class V only when the virtual base class V has a fixed part of its object that contains both a VFT pointer and other data and the derived class D has a fixed part of its object that only contains the VFT pointer.

2. The computer implemented method of modeling C++ objects in an implementation of the C++ programming language recited in claim 1 further comprising the step of storing said virtual base pointers in said VFT as offsets to said virtual base subobjects.

3. The computer implemented method of modeling C++ objects in an implementation of the C++ programming language recited in claim 1 wherein a class C shares virtual base pointers with those base classes that share their VFT pointer with class C.

4. The computer implemented method of modeling C++ objects in an implementation of the C++ programming language recited in claim 1 wherein a VFT entry contains only an address of the function when no late cast is required.

5. The computer implemented method of modeling C++ objects in an implementation of the C++ programming language recited in claim 1 wherein a VFT entry contains only an address of a code performing a late cast's adjustment when a late cast is required.

6. The computer implemented method of modeling C++ objects in an implementation of the C++ programming language recited in claim 1 wherein a VFT for a class contains entries for all virtual functions that are visible at the class.

7. The computer implemented method of modeling C++ objects in an implementation of the C++ programming language recited in claim 1 wherein when a fully derived object of class D, with static type S, is pointed to by p in a virtual function call p→f( ), and the actual function invoked is f defined in class E, denoted by E::f( ), an early cast is an adjustment of a THIS pointer to a subobject, X, in the D object whose VFT contains the entry that has an address of E::f( ), a late cast is an adjustment of the THIS pointer to point to an E subobject if the E and X subobjects are at different locations within the D object, a class C is defined as an introducing class of a virtual function f, the class C declaring the virtual function f and no base class of C in $\mathcal{H}$ declaring f, and the VFT contains entries for all virtual functions introduced in a class T and for all virtual functions introduced in the virtual region of the class T, thereby eliminating a need for an early virtual cast.

8. The computer implemented method of modeling C++ objects in an implementation of the C++ programming language recited in claim 1 wherein when a fully derived object of class D, with static type S, is pointed to by p in a virtual function call p→f( ), and the actual function invoked is f defined in class E, denoted by E::f( ), an early cast is an adjustment of a THIS pointer to a subobject, X, in the D object whose VFT contains the entry that has an address of E::f( ), a late cast is an adjustment of the THIS pointer to point to an E subobject if the E and X subobjects are at different locations within the D object, a class C is defined as an introducing class of a virtual function f, the class C declaring the virtual function f and no base class of C in $\mathcal{H}$ declaring f, the VFT contains entries for all virtual functions introduced in a class T, and if there is a direct virtual base V of the class D which is not a direct virtual base of any base class of the class D, then the class D's VFT contains an entry for all virtual functions introduced in the nonvirtual region of the class V, thereby eliminating a need for an early virtual cast.

9. A computer implemented method of modeling C++ objects in an implementation of the C++ programming language in which a class in the C++ language may inherit another class, an inherited class being known as a base class and an inheriting class being known as a derived class, a class hierarchy graph, $\mathcal{H}$, for a C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a nonvirtual region for a class D is the set of classes such that for each class B in this set, there is a nonvirtual path in $\mathcal{H}$ from B to D, a class V is a direct, virtual base of a class D if and only if there is an edge labeled virtual in $\mathcal{H}$ from V to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a virtual region for the class D being a set of classes such that for each class V in the set, there is a virtual path in $\mathcal{H}$ from V to D, said computer implemented method comprising the steps of:

laying out a virtual function table (VFT) in computer memory having a number of entries, said virtual function table entry having at least a function address and supporting a virtual dispatch mechanism;

laying out an object in computer memory to include as components of the object all base class subobjects of the object, data members defined in the class, and a VFT pointer to the VFT for implementing the virtual dispatch mechanism required for virtual functions;

laying out virtual base pointers in computer memory to access virtual base subobjects;

sharing with a derived class D a VFT pointer and at least one virtual base pointer of a direct, virtual base class V only when the virtual base class V has a fixed part of its object that contains only both a VFT pointer and at least one virtual base pointer.

10. The computer implemented method of modeling C++ objects in an implementation of the C++ programming language recited in claim 9 further comprising the step of storing said virtual base pointers in said object as offsets to said virtual base subobjects.

11. The computer implemented method of modeling C++ objects in an implementation of the C++ programming language recited in claim 9 wherein a class C shares virtual base pointers with those base classes that share their VFT pointer with class C.

12. The computer implemented method of modeling C++ objects in an implementation of the C++ programming language recited in claim 9 wherein a VFT entry contains only an address of the function when no late cast is required.

13. The computer implemented method of modeling C++ objects in an implementation of the C++ programming language recited in claim 9 wherein a VFT entry contains only an address of a code performing a late cast's adjustment when a late cast is required.

14. The computer implemented method of modeling C++ objects in an implementation of the C++ programming language recited in claim 9 wherein a VFT for a class contains entries for all virtual functions that are visible at the class.

15. The computer implemented method of modeling C++ objects in an implementation of the C++ programming language recited in claim 9 wherein when a fully derived object of class D, with static type S, is pointed to by p in a virtual function call p→f( ), and the actual function invoked is f defined in class E, denoted by E::f( ), an early cast is an adjustment of a THIS pointer to a subobject, X, in the D object whose VFT contains the entry that has an address of E::f( ), a late cast is an adjustment of the THIS pointer to point to an E subobject if the E and X subobjects are at different locations within the D object, a class C is defined as an introducing class of a virtual functions f, the class C declaring the virtual function f and no base class of C in $\mathcal{H}$ declaring f, and the VFT contains entries for all virtual functions introduced in a class T and for all virtual functions introduced in the virtual region of the class T, thereby eliminating a need for an early virtual cast.

16. The computer implemented method of modeling C++ objects in an implementation of the C++ programming language recited in claim 9 wherein when a fully derived object of class D, with static type S, is pointed to by p in a virtual function call p→f( ), and the actual function invoked is f defined in class E, denoted by E::f( ), an early cast is an adjustment of a THIS pointer to a subobject, X, in the D object whose VFT contains the entry that has an address of E:f( ), a late cast is an adjustment of the THIS pointer to point to an E subobject if the E and X subobjects are at different locations within the D object, a class C is defined as an introducing class of a virtual function f, the class C declaring the virtual function f and no base class of C in $\mathcal{H}$ declaring f, the VFT contains entries for all virtual functions introduced in a class T, and if there is a direct virtual base V of the class D which is not a direct virtual base of any base class of the class D, then the class D's VFT contains an entry for all virtual functions introduced in the nonvirtual region of the class V, thereby eliminating a need for an early virtual cast.

17. A computer implemented method of modeling C++ objects in an implementation of the C++ programming language in which a class in the C++ language may inherit another class, an inherited class being known as a base class and an inheriting class being known as a derived class, a class hierarchy graph, $\mathcal{H}$, for a C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a nonvirtual region for a class D is the set of classes such that for each class B in this set, there is a nonvirtual path in $\mathcal{H}$ from B to D, a class V is a direct, virtual base of a class D if and only if there is an edge labeled virtual in $\mathcal{H}$ from V to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a virtual region for the class D being a set of classes such that for each class V in the set, there is a virtual path in $\mathcal{H}$ from V to D, said computer implemented method comprising the steps of:
- laying out a virtual function table (VFT) in computer memory having a number of entries, said virtual function table entry having at least a function address and supporting a virtual dispatch mechanism;
- laying out an object in computer memory to include as components of the object all base class subobjects of the object, data members defined in the class, and a VFT pointer to the VFT for implementing the virtual dispatch mechanism required for virtual functions;
- laying out virtual base pointers in computer memory to access virtual base subobjects;
- sharing with a derived class D at least one virtual base pointer of a direct, virtual base class V only when the virtual base class V has a fixed part of its object that contains only at least one virtual base pointer; and
- sharing with a derived class D at least one virtual base pointer of a direct, virtual base class V only when the virtual base class V has a fixed part of its object that contains both at least one virtual base pointer and other data and the derived class D has a fixed part of its object that only contains the at least one virtual base pointer.

18. The computer implemented method of modeling C++ objects in an implementation of the C++ programming language recited in claim 17 further comprising the step of storing said virtual base pointers in said object as offsets to said virtual base subobjects.

19. A computer implemented method of modeling C++ objects in an implementation of the C++ programming language in which a class in the C++ programming language may inherit another class, an inherited class being known as a base class and an inheriting class being known as a derived class, a class hierarchy graph, $\mathcal{H}$, for a C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a nonvirtual region for a class D is the set of classes such that for each class B in this set, there is a nonvirtual path in $\mathcal{H}$ from B to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a virtual region for the class D being a set of classes such that for each class V in the set, there is a virtual path in $\mathcal{H}$ (from V to D, said computer implemented method comprising the steps of:
- laying out a virtual function table (VFT) in computer memory having a number of entries, said VFT entries having at least a function address and supporting a virtual dispatch mechanism;
- laying out an object in computer memory to include as components of the object all base class subobjects of the object, data members defined in the class, and a VFT pointer to the VFT for implementing the virtual dispatch mechanism required for virtual functions; and
- laying out virtual base pointers in computer memory to access virtual base subobjects, wherein when a fully derived object of class D, with static type S, is pointed to by p in a virtual function call p →f( ), and the actual function invoked is f defined in class E, denoted by E::f( ), an early cast is an adjustment of a THIS pointer to a subobject, X, in the D object whose VFT contains the entry that has an address of E::f( ), a late cast is an adjustment of the THIS pointer to point to an E subobject if the E and X subobjects are at different locations within the D object, a class C is defined as an introducing class of a virtual function f, the class C declaring the virtual function f and no base class of C in $\mathcal{H}$ declaring f, the VFT contains entries for all virtual functions introduced in a class T and for all virtual functions introduced in the virtual region of the class T, thereby eliminating a need for an early virtual cast.

20. The computer implemented method of modeling C++ objects in an implementation of the C++ programming language recited in claim 19 further comprising the step of storing said virtual base pointers in said VFT as offsets to virtual base subobjects.

21. A computer implemented method of modeling C++ objects in an implementation of the C++ programming language in which a class in the C++ language may inherit another class, an inherited class being known as a base class and an inheriting class being known as a derived class, a class hierarchy graph, $\mathcal{H}$, for a C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a nonvirtual region for a class D is the set of classes such that for each class B in this set, there is a nonvirtual path in $\mathcal{H}$ from B to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a class V being a virtual base of a class D if there is a virtual path in $\mathcal{H}$ from V to D, a virtual region for the class D being a set of classes such that for each class V in the set, there is a virtual path in $\mathcal{H}$ from V to D, said computer implemented method comprising the steps of:

- laying out a virtual function table (VFT) in computer memory having a number of entries, said VFT entries having at least a function address and supporting a virtual dispatch mechanism;
- laying out an object in computer memory to include as components of the object all base class subobjects of the object, data members defined in the class, and a VFT pointer to the VFT for implementing the virtual dispatch mechanism required for virtual functions; and
- laying out virtual base pointers in computer memory to access virtual base subobjects, wherein when a fully derived object of class D, with static type S, is pointed to by p in a virtual function call p→f( ), and the actual function invoked is $f$ defined in class E, denoted by E::$f$( ), an early cast is an adjustment of a THIS pointer to a subobject, X, in the D object whose VFT contains the entry that has an address of E::$f$( ), a late cast is an adjustment of the THIS pointer to point to an E subobject if the E and X subobjects are at different locations within the D object, a class C is defined as an introducing class of a virtual function $f$, the class C declaring the virtual function $f$ and no base class of C in $\mathcal{H}$ declaring $f$, the VFT contains entries for all virtual functions introduced in a class T, and if there is a direct virtual base V of the class D which is not a direct virtual base of any base class of the class D, then the class D's VFT contains an entry for all virtual functions introduced in the nonvirtual region of the class V, thereby eliminating a need for an early virtual cast.

22. The computer implemented method of modeling C++ objects in an implementation of the C++ programming language recited in claim 21 further comprising the step of storing said virtual base pointers in said VFT as offsets to virtual base subobjects.

23. A computer implemented method of modeling C++ objects in an implementation of the C++ programming language in which a class in the C++ language may inherit another class, an inherited class being known as a base class and an inheriting class being known as a derived class, a class hierarchy graph, $\mathcal{H}$, for an C++ language program being defined as a tuple <N,E> where N is a set of nodes representing classes in the program and E is a set of directed edges representing inheritance relationships between the classes, a nonvirtual path from class B to class D is a path in $\mathcal{H}$ from the node labeled B to the node labeled D such that there is no virtual inheritance edge along this path, a virtual path from class V to class D is a path in $\mathcal{H}$ from the node labeled V to the node labeled D such that there is at least one virtual inheritance edge along this path, a nonvirtual region for a class D is the set of classes such that for each class B in this set, there is a nonvirtual path in $\mathcal{H}$ from B to D, a virtual path from class V to class D is a path in $\mathcal{H}$ from the node labeled V to the node labeled D such that there is at least one virtual inheritance edge along this path, a class V being a virtual base of a class D if there is a virtual path in $\mathcal{H}$ from V to D, a virtual region for the class D being a set of classes such that for each class V in the set, there is a virtual path in $\mathcal{H}$ from V to D, wherein when a fully derived object of class D, with static type S, is pointed to by p in a virtual function call p→$f$( ), and the actual function invoked is $f$ defined in class E, denoted by E::$f$( ), an early cast is an adjustment of a THIS pointer to a subobject, X, in the D object whose VFT contains the entry that has an address of E::$f$( ), a late cast is an adjustment of the THIS pointer to point to an E subobject if the E and X subobjects are at different locations within the D object, said computer implemented method comprising the steps of:

- laying out a virtual function table (VFT) in computer memory having a number of entries, said VFT table entries having at least a function address and supporting a virtual dispatch mechanism;
- laying out an object model in computer memory to include as components of the object all base class subobjects of the object, data members defined in the class, and a VFT pointer to the VFT for implementing the virtual dispatch mechanism required for virtual functions;
- laying out virtual base pointers in computer memory to access virtual base subobjects; and
- performing a nonvirtual cast, for a virtual function call p→$f$( ), to a most derived subobject that is a base-or-self of the static type pointed to by p and defines a virtual function $f$( ) and has an entry for $f$( ) in its VFT, if such a subobject exists, thereby providing a virtual dispatch that eliminates late casts where possible.

24. The computer implemented method of modeling C++ objects in an implementation of the C++ programming language recited in claim 23 wherein the VFT contains entries for all virtual functions introduced in the class and for all virtual functions introduced in the virtual region of the class, thereby eliminating a need for an early virtual cast.

25. The computer implemented method of modeling C++ objects in an implementation of the C++ programming language recited in claim 24 further comprising the step of storing said virtual base pointers in said VFT as offsets to virtual base subobjects.

26. The computer implemented method of modeling C++ objects in an implementation of the C++ programming language recited in claim 23 wherein the VFT contains entries for all virtual functions introduced in a class T, and if there is a direct virtual base V of the class D which is not a direct virtual base of any base class of the class D, then the class D's VFT contains an entry for all virtual functions introduced in the nonvirtual region of the class V, thereby eliminating a need for an early virtual cast.

27. The computer implemented method of modeling C++ objects in an implementation of the C++ programming language recited in claim 26 further comprising the step of storing said virtual base pointers in said VFT as offsets to virtual base subobjects.

28. The computer implemented method of modeling C++ objects in an implementation of the C++ programming language recited in claim 23 wherein a VFT for a class contains entries for all virtual functions that are visible at the class.

29. The computer implemented method of modeling C++ objects in an implementation of the C++ programming language recited in claim 23 wherein a VFT for a class contains entries for all virtual functions that are introduced in the class.

* * * * *